(12) United States Patent
Kuriyama

(10) Patent No.: US 7,359,181 B2
(45) Date of Patent: Apr. 15, 2008

(54) SOLID ELECTROLYTIC CAPACITOR

(75) Inventor: Chojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 231 days.

(21) Appl. No.: 11/243,035

(22) Filed: Oct. 4, 2005

(65) Prior Publication Data

US 2007/0188982 A1    Aug. 16, 2007

(30) Foreign Application Priority Data

Oct. 4, 2004   (JP)  ............................ 2004-291100

(51) Int. Cl.
*H01G 4/228*   (2006.01)
*H01G 9/00*    (2006.01)

(52) U.S. Cl. ..................................... 361/540; 361/538

(58) Field of Classification Search ........ 361/532–533, 361/538–540
See application file for complete search history.

(56) References Cited

U.S. PATENT DOCUMENTS

| | | | |
|---|---|---|---|
| 4,017,773 A * | 4/1977 | Cheseldine | 361/532 |
| 5,390,074 A * | 2/1995 | Hasegawa et al. | 361/540 |
| 6,493,214 B1 * | 12/2002 | Kanetake et al. | 361/531 |
| 6,717,793 B2 * | 4/2004 | Arai et al. | 361/306.1 |

FOREIGN PATENT DOCUMENTS

JP    2003-163137    6/2003

* cited by examiner

*Primary Examiner*—Eric Thomas
(74) *Attorney, Agent, or Firm*—Hamre, Schumann, Mueller & Larson, P.C.

(57) ABSTRACT

A solid electrolytic capacitor includes a porous sintered body made of valve metal, and an external anode terminal used for surface-mounting. The anode terminal is offset from the center of the sintered body, as viewed in the thickness direction or first direction of the sintered body. Further, the anode terminal is spaced away from the sintered body in a second direction which is perpendicular to the first direction. Between the sintered body and the anode terminal is formed a conductive path, which is inclined with respect to both the first and the second directions. The path comes closer to the anode terminal in the first direction as it goes farther away from the sintered body in the second direction.

8 Claims, 12 Drawing Sheets

SOLID ELECTROLYTIC CAPACITOR

BACKGROUND OF THE INVENTION

1. Field of the Invention

The present invention relates to a solid electrolytic capacitor comprising a porous sintered body made of a valve metal, and also relates to a manufacturing method of making the same.

2. Description of the Related Art

An example of a solid electrolytic capacitor includes a capacitor utilized for canceling noise generated by a device such as CPU, or for stabilizing power supply for an electronic device. (Refer to JP-A-2003-163137, for example.) FIG. 19 illustrates an example of such a solid electrolytic capacitor. The illustrated solid electrolytic capacitor X includes a porous sintered body 90 made of a metal having valve action. The porous sintered body 90 is provided with an anode wire 91 partly protruding out thereof. The surface of the porous sintered body 90 is formed with a cathode conductive layer 92. Each of the anode wire 91 and the conductive layer 92 is connected to a respective one of conductive members 93, 94 partly protruding from a sealing resin 95 to serve as an external anode terminal 93a and an external cathode terminal 94a for surface mounting. The frequency characteristic of the impedance Z at the solid electrolytic capacitor is given by the following formula.

$$Z=\sqrt{(R^2+(1/\omega C-\omega L)^2)}$$

($\omega$: $2\pi f$ (f: frequency), C: capacity, R: resistance, L: inductance)

As seen from the above formula, in a low frequency range in which the frequency is lower than the self-resonance point, "$1/\omega C$" is dominant, where the impedance can be lowered by increasing the capacity of the solid electrolytic capacitor X. In a high frequency range in which the frequency is around the self-resonance point, the resistance "R" is dominant, where it is required to lower ESR (equivalent series resistance) of the solid electrolytic capacitor X. Further, in an ultrahigh frequency range in which the frequency is higher than the self-resonance point, "$\omega L$" is dominant, where it is required to lower ESL (equivalent series inductance) of the solid electrolytic capacitor X.

Recently, noise at a high frequency including high harmonic component is generated by a device having a high clock frequency, such as a CPU. Further, in accordance with an increase in operation speed and digitalization of electronic devices, a power supply system with high responsiveness has become necessary. For such use, the solid electrolytic capacitor X is also strongly desired to have a lowered ESL. In order to lower the ESL, the shape of the porous sintered body 90 may be changed, or a plurality of anode wires 91 may be provided. However, the conductive path between the external anode terminal 93a and the porous sintered body 90 includes a vertical portion 93b, at the conductive member 93, that extends perpendicular to the longitudinal direction of a circuit board on which the solid electrolytic capacitor X is to be mounted. Through the vertical portion, the electrical current passes in a direction different from the adjacent portions of the conductive path. Thus, the length of the vertical portion is proportional to the inductance, and thus to the impedance at a high frequency range. Therefore, the solid electrolytic capacitor X cannot have a sufficiently lowered ESL.

SUMMARY OF THE INVENTION

The present invention has been proposed under the above-described circumstances. It is therefore an object of the present invention to provide a solid electrolytic capacitor having a lowered ESL, and a manufacturing method of making the same.

To achieve the above object, the present invention provides following technique.

A solid electrolytic capacitor according to a first aspect of the present invention includes a porous sintered body made of a metal having valve action, and an external anode terminal for surface mounting. The external anode terminal is arranged at a position which is offset to one side relative to an intermediate portion of the porous sintered body, as viewed in a first direction, i.e., the thickness direction of the porous sintered body. Further, the anode terminal is arranged at a position which is apart from the porous sintered body in a second direction perpendicular to the first direction. A conductive path is formed between the porous sintered body and the external anode terminal. This conductive path is inclined relative to both of the first and the second directions. The path comes closer to the external anode terminal in the first direction, as proceeding apart from the porous sintered body in the second direction.

Due to the above structure, the vertical portion extending in the first direction can be shortened, or be eliminated from the conductive path. Further, the conductive path can be bent by a minute angle. Thus, the conductive path can have a lowered inductance and thus have a small impedance at a high frequency range. Therefore, the structure is suitable to lower the ESL of the solid electrolytic capacitor. Further, the shortened vertical portion enables to make a thin solid electrolytic capacitor.

According to a preferable embodiment of the present invention, the solid electrolytic capacitor further comprises an anode wire made of a metal having valve action. The anode wire protrudes from a surface of the porous sintered body that faces in the second direction. The wire is connected to the external anode terminal. The anode wire includes an inclined portion inclined relative to both of the first and the second directions to serve as the conductive path. Due to this, the inclined portion inclined relative to both of the first and the second directions can be easily formed at the conductive path.

According to a preferable embodiment of the present invention, the anode wire is formed by bending a rod-shaped metal material having valve action.

According to a preferable embodiment of the present invention, the anode wire is formed with a cutout at a portion to be bent. Due to this, no excessive stress is applied to the porous sintered body during the bending process.

According to a preferable embodiment of the present invention, the anode wire includes a flat portion which is to be bent. The flat portion is formed by at least partly compressing a portion of the anode wire protruding from the porous sintered body. Due to this, the bending step can be performed by a reduced force, and thus the structure is suitable to reduce the stress applied to the porous sintered body.

According to a preferable embodiment of the present invention, a ring is fitted around the base of the anode wire. Due to this, the stress applied to the porous sintered body is shared with the ring.

According to a preferable embodiment of the present invention, the ring is made of a resin, so that the ring does not suffer from erosion during manufacture of the solid electrolytic capacitor.

According to a preferable embodiment of the present invention, the solid electrolytic capacitor further comprises an anode wire protruding from a surface of the porous sintered body that faces in the second direction, and a conductive member interposed between the anode wire and the external anode terminal as viewed in the first direction. A solder fillet is provided to connect the conductive member and the external anode terminal, to form the conductive path. Due to this, the inclined portion is formed properly at the conductive path, and the solid electrolytic capacitor can have a lowered ESL.

According to a preferable embodiment of the present invention, the solid electrolytic capacitor further comprises a plurality wires equivalent to the above-mentioned anode wire. Due to this, the solid electrolytic capacitor has a lowered ESR and ESL.

According to a second aspect of the present invention, there is provided a method of making a solid electrolytic capacitor including a porous sintered body made of a metal having valve action. The method comprises the following steps. First, a porous sintered body provided with a metal rod having valve action is formed. The metal rod is caused to protrude from the porous sintered body in a second direction perpendicular to a first direction, that is, the thickness direction of the porous sintered body. Then, an anode wire is formed after the porous sintered body is formed. At this stage, the metal rod is bent so that the anode wire is formed with an inclined portion inclined relative to both of the first and the second directions. Then, an external anode terminal is bonded to an end of the anode wire. With this method, the solid electrolytic capacitor according to the first aspect of the present invention can be properly made.

According to a preferable embodiment of the present invention, before the metal rod is bent, a cutout is made in the metal rod at a portion to be bent. Due to this, the bending step can be performed by an advantageously small force, thereby reducing the stress applied to the porous sintered body.

According to a preferable embodiment of the present invention, the cutout is wedge-shaped in section, and includes one surface perpendicular to the longitudinal direction of the metal rod, and other surface inclined relative to the longitudinal direction of the metal rod. Due to this, the bending force can be prevented from being unduly applied to the metal during the bending step.

According to a preferable embodiment of the present invention, a portion containing a part to be bent in the metal rod is compressed in the first direction before the bending is performed, thereby producing a flat portion, and wherein this flat portion is subjected to the bending. In this manner, the bending can be performed easily.

According to a preferable embodiment of the present invention, the method further comprises the step of forming a ring at the base of the metal rod after the porous sintered body is formed and before the metal rod is bent.

According to a preferable embodiment of the present invention, the ring is made of a resin. Due to this, the ring helps to reduce the bending force applied to the porous sintered body during the bending step. Further, the resin infiltrates into the porous sintered body from around the base of the metal rod. Thus, the relevant part of the porous sintered body is reinforced, and can be prevented from being broken in the bending step.

Other features and advantages will be apparent from the following description of the embodiments with reference to the accompanying drawings.

DESCRIPTION OF THE PREFERRED EMBODIMENTS

Preferred embodiments of the present invention will now be described below with reference to the accompanying drawings.

Figure 1:
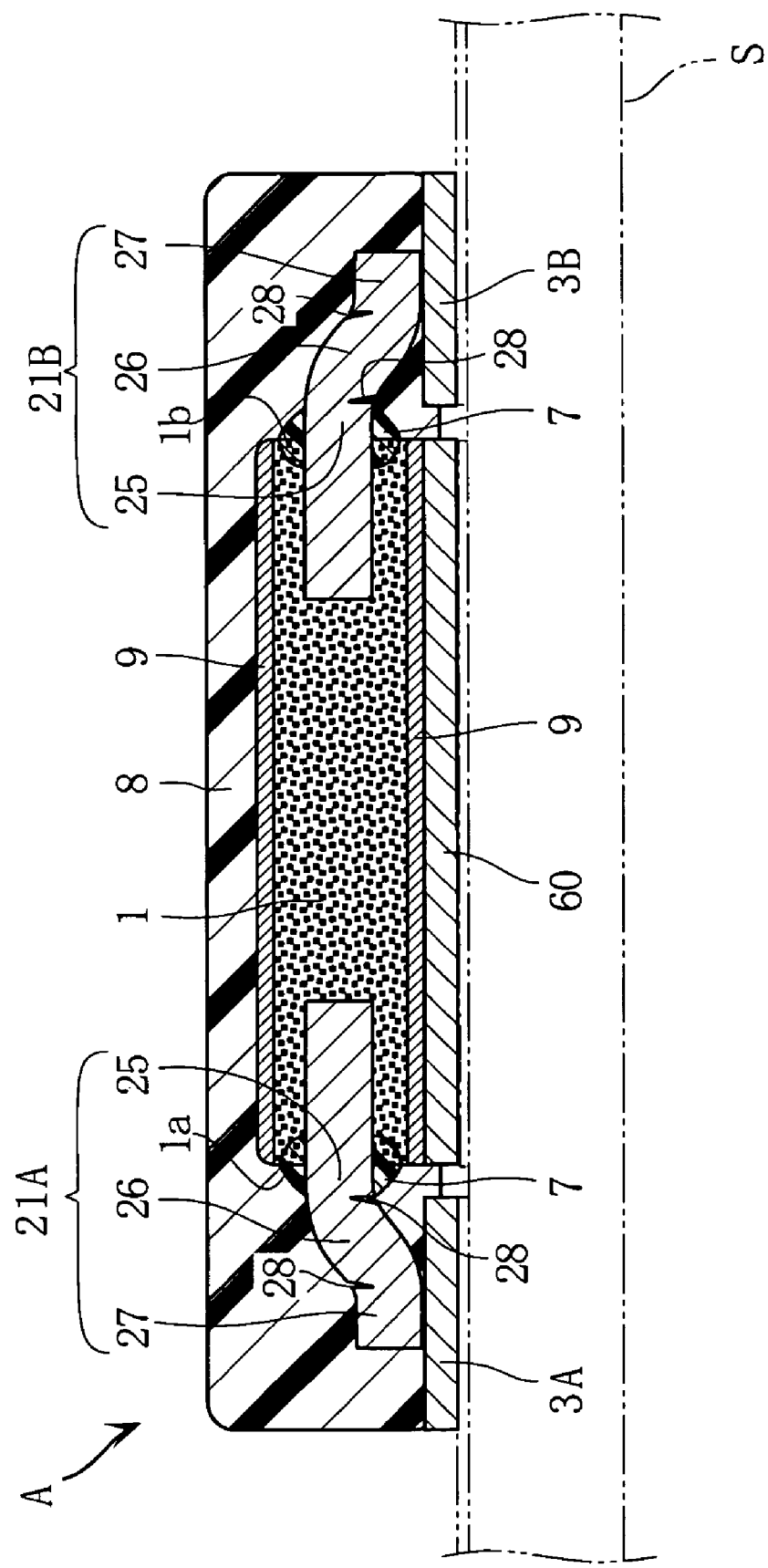
FIG. 1 is a sectional view illustrating a solid electrolytic capacitor according to a first embodiment of the present invention.
Figure 2:
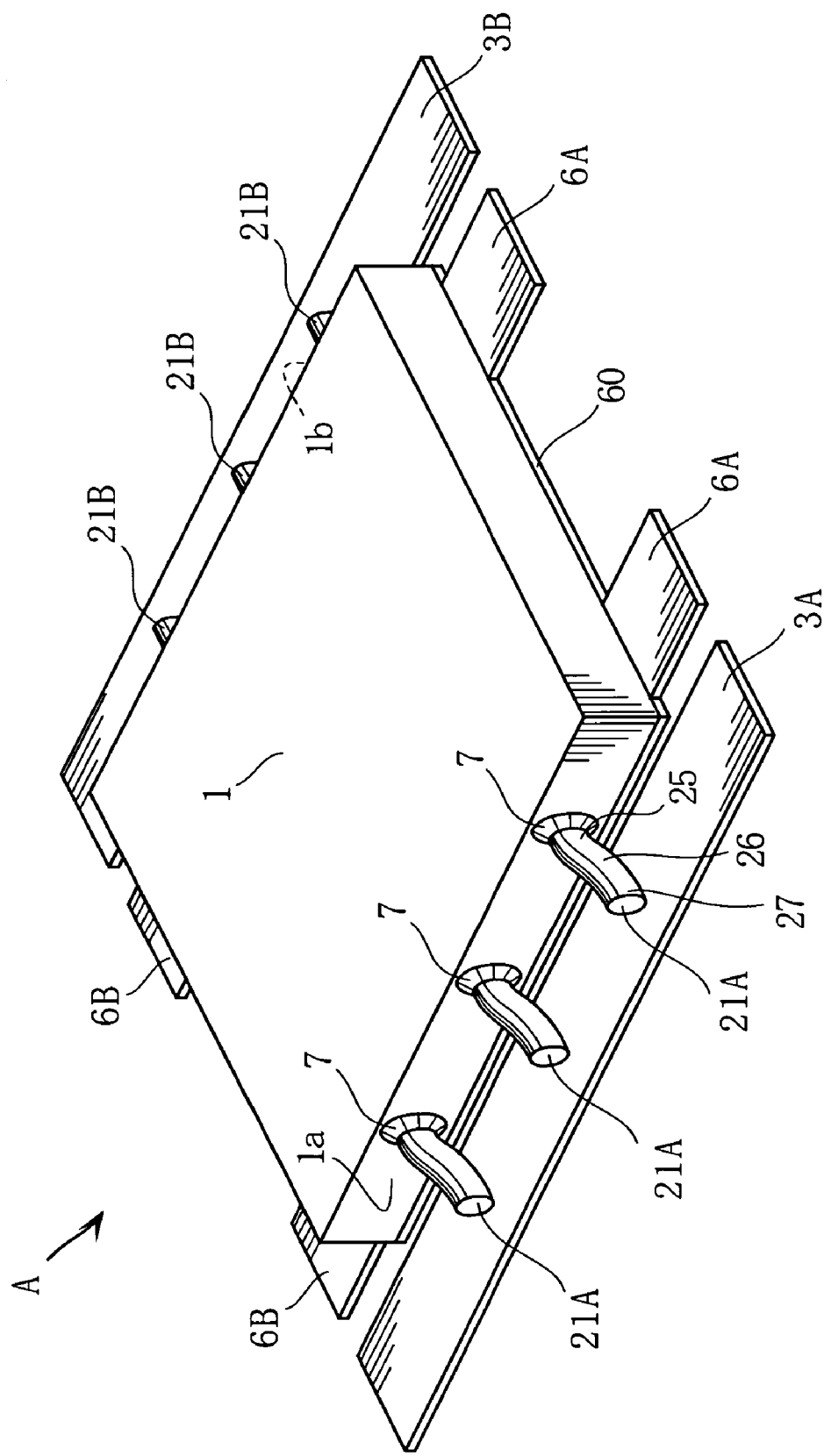
FIG. 2 is a perspective view illustrating the principal part of the solid electrolytic capacitor of the present invention.

FIGS. 1 and 2 illustrate an example of a solid electrolytic capacitor according to the present invention. As shown in FIG. 1, the solid electrolytic capacitor A of the present embodiment includes a porous sintered body 1, anode wires 21A, 21B, external anode terminals 3A, 3B, external cathode terminals 6A, 6B, and a sealing resin 8. The sealing resin 8 is not shown in FIG. 2.

As shown in FIG. 2, the porous sintered body 1 is made of niobium having valve action, by compacting niobium powder to be a rectangular board and then sintering the board. In the sintered niobium powder making the porous sintered body 1, adjacent niobium particles form minute gaps. The surface of the above sintered powder is formed with a dielectric layer (not shown) made of niobium oxide, for example. Further, the surface of the dielectric layer is formed with a solid electrolyte layer (not shown). The solid electrolyte layer is made of e.g. manganese dioxide or of conductive polymer, and preferably, covers all of the gaps between the niobium particles. Any material may be used to make the porous sintered body 1 if it has valve action, and tantalum may be used in place of niobium.

As shown in FIG. 1, the external surface of the porous sintered body 1 is formed with a conductive layer 9 electrically connected to the solid electrolyte layer. The conductive layer 9 includes a graphite layer and also includes a silver layer formed on the graphite layer using silver paste, for example.

As shown in FIG. 2, the anode wires 21A, 21B are made of a metal material having valve action, such as niobium, similarly to the porous sintered body 1. Three of the anode wires protruding from a side surface 1a of the porous sintered body 1 are the anode wires 21A for input, while the other three of the anode wires protruding from another side surface 1b of the porous sintered body are the anode wires 21B for output. The anode wires 21A, 21B protrude in directions perpendicular to the thickness direction of the porous sintered body 1.

Each of the anode wires 21A, 21B includes a base 25, an inclined portion 26, and a tip end 27. The base 25, the inclined portion 26, and the tip end 27 are formed by bending a niobium rod which is the material of the anode wires 21A, 21B. Each of the portions to be bent is formed with a cutout 28. As shown in FIG. 1, the inclined portion 26 is inclined relative to the thickness direction of the porous sintered body 1 (the vertical direction in the figure), which is a first direction of the present invention, and is also inclined relative to the lateral direction in the figure, which is a second direction of the present invention.

The base 25 of each of the anode wires 21A, 21B is provided with a resin ring 7. In the present embodiment, the resin ring 7 fits around the base 25, and partly infiltrates into the porous sintered body 1. The resin ring 7 is made of epoxy resin, for example.

As shown in FIG. 2, each of the two external anode terminals 3A, 3B is respectively connected to the three of the anode wires 21A, 21B, and is exposed from the sealing resin 8, as shown in FIG. 1. The external anode terminals 3A, 3B are used for surface mounting of the solid electrolytic capacitor A onto a circuit board S. The external anode terminals 3A, 3B are rectangular metal plates bonded to the anode wires 21A, 21B by e.g. solder or conductive resin (neither of them is shown).

As shown in FIG. 1, a cathode metal plate 60 is bonded to the under surface of the porous sintered body 1 via the conductive layer 9. As shown in FIG. 2, the cathode metal plate 60 includes four extensions, two each of which serve as a respective one of the external cathode terminals 6A, 6B for input and output. Thus, the solid electrolytic capacitor A is provided with the external anode terminals 3A, 3B for input and output, as well as with the external cathode terminals 6A, 6B for input and output, that is, the so-called four terminal type.

As shown in FIG. 1, the sealing resin 8 forms a resin package covering the porous sintered body 1 and the anode wires 21A, 21B for protection. The sealing resin 8 is made of a thermosetting resin such as epoxy resin.

Next, a manufacturing method of the solid electrolytic capacitor A is described below with reference to FIGS. 3-7.

Figure 3:
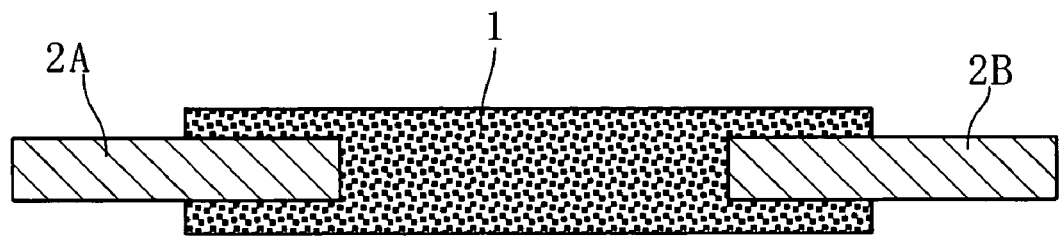
FIG. 3 is a sectional view illustrating a step of a method of making the solid electrolytic capacitor of the present invention.

First, as shown in FIG. 3, the porous sintered body 1 is made of niobium having valve action. The porous sintered body 1 is provided with niobium rods 2A, 2B protruding out thereof. Such porous sintered body 1 may be made by filling niobium fine powder into a mold, shaping it by pressure forming, and then sintering it, with the metal rods 2A, 2B partly inserted into the fine powder.

Figure 4:
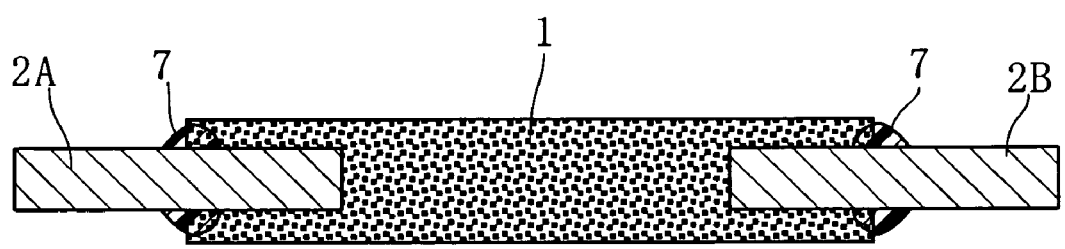
FIG. 4 is a sectional view illustrating another step of the method of making the solid electrolytic capacitor of the present invention.

After making the porous sintered body 1, as shown in FIG. 4, the resin rings 7 are formed at the bases of the metal rods 2A, 2B. In forming the resin rings 7, liquid epoxy resin having relatively high viscosity is dropped to cover the bases of the metal rods 2A, 2B. Preferably, the liquid epoxy resin infiltrates into the porous sintered body 1. After a predetermined time in this state, the liquid epoxy resin is solidified to be resin rings 7.

Figure 5:
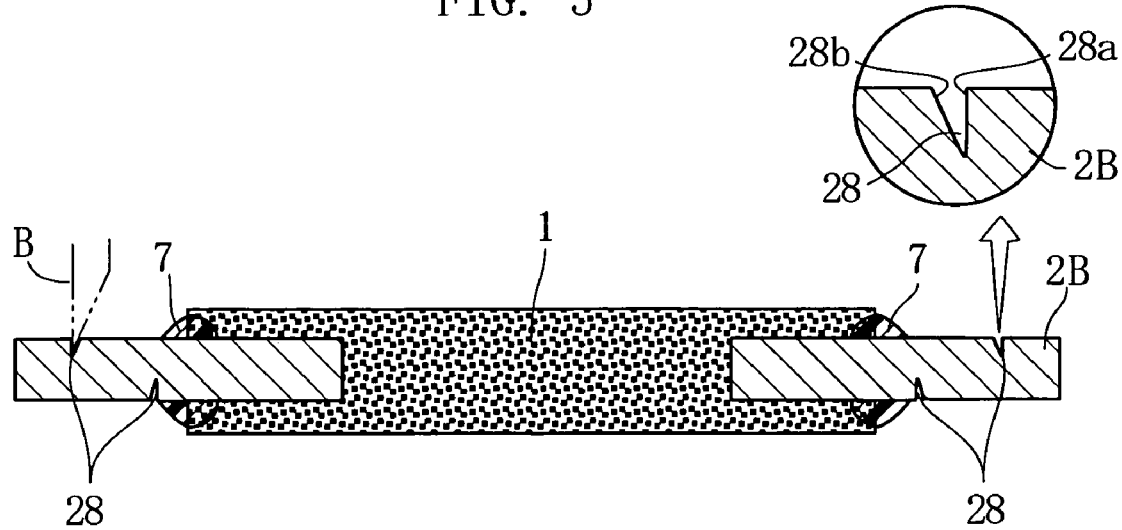
FIG. 5 is a sectional view illustrating another step of the method of making the solid electrolytic capacitor of the present invention.

After forming the resin rings 7, as shown in FIG. 5, the metal rods 2A, 2B are formed with the cutouts 28. The cutouts 28 are formed by partly cutting the metal rods 2A, 2B, using a cutting tool B. The cutouts 28 are formed at two portions of each of the metal rods 2A, 2B, at an upper portion near the tip end and a lower portion near the base. Each of the cutouts 28 includes surfaces 28a, 28b and is wedge-shaped in section. In forming the cutouts 28, the cutting tool B strikes the metal rods at a predetermined angle so that the surface 28a is formed to be perpendicular to the longitudinal direction of the metal rods 2A, 2B, while the surface 28b is formed to be inclined relative to the longitudinal direction of the metal rods 2A, 2B.

Figure 6:
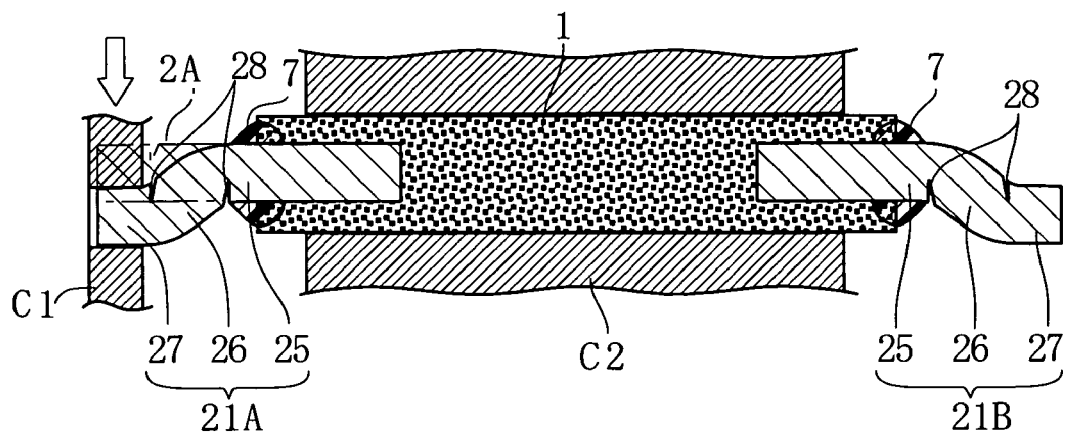
FIG. 6 is a sectional view illustrating another step of the method of making the solid electrolytic capacitor of the present invention.

After forming the cutouts 28, as shown in FIG. 6, the metal rods 2A, 2B are bent to form the anode wires 21A, 21B. First, the porous sintered body 1 is fixed by a clamp C2. The tip end 21 of the metal rod 2A is held by a clamp C1. Next, the clamp C1 is moved downward relative to the clamp C2, to apply a bending moment to the metal rod 2A. As the metal rod 2A is formed with two cutouts 28, the flexural rigidity is lowered at the portions formed with the cutouts 28. Thus, these portions of the metal rod 2A are bent in the closing direction of the cutouts 28. Through the bending process, the anode wires 21A, 21B each including the tip end 27, the inclined portion 26, and the base 25 are made. The clamp C1 is pressed down at a predetermined distance so that the inclined portion 26 is inclined at a desired angle.

The cutouts 28 are useful for bending only the desired portions of the metal rods 2A, 2B. Further, due to the cutouts, the porous sintered body 1 can be prevented from unduly receiving bending force during the bending process. Still further, in the present embodiment, the resin rings 7 alleviate the bending force applied to the porous sintered body 1. The inventor carried out a following experiment. A porous sintered body 1 having a thickness of 1.5 mm was provided with a metal rod 2A' having a diameter of 0.5 mm and a protruding length of 2 mm. The tip end of the metal rod 2A' was pressed down by 0.5 mm to be bent, and was provided with a resin ring 7. The experiment proved that the resin ring decreased the stress applied to such porous sintered body 1 to ⅕.

After forming the anode wires 21A, 21B, the porous sintered body 1 is formed with the dielectric layer (not shown) and the solid electrolyte layer (not shown). In forming the dielectric layer, either of the anode wires 21A, 21B is held while the porous sintered body 1 is immersed in chemical liquid containing an aqueous solution of phosphoric acid, for example. In this way, the porous sintered body 1 is anodized and the dielectric layer containing niobium pentoxide is formed. In forming the solid electrolyte layer, a step in which, for example, the porous sintered body 1 is immersed in an aqueous solution of e.g. manganese nitrate and then a step in which the porous sintered body is sintered, are repeated several times.

Figure 7:
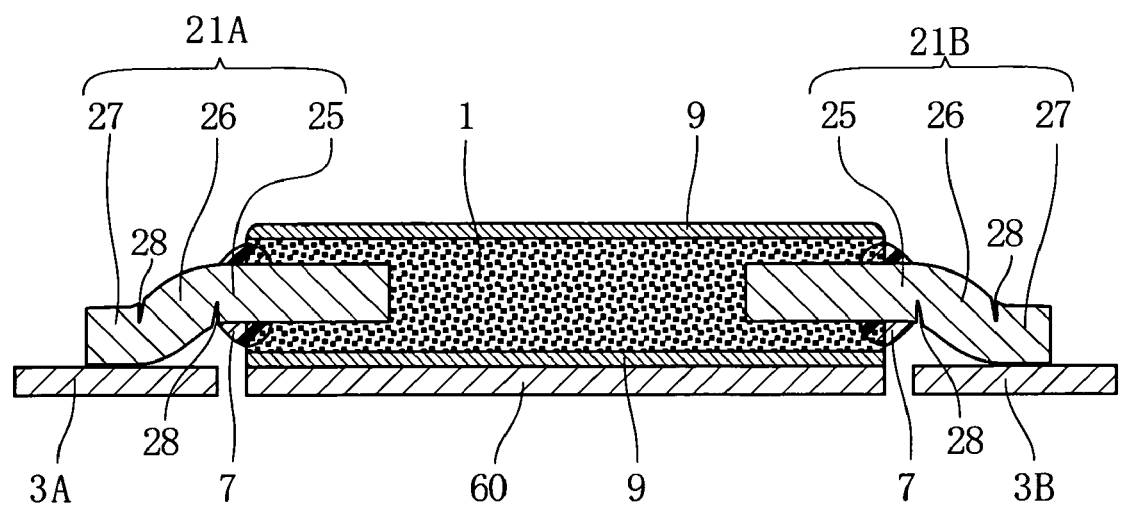
FIG. 7 is a sectional view illustrating another step of the method of making the solid electrolytic capacitor of the present invention.

After forming the solid electrolyte layer, as shown in FIG. 7, the conductive layer 9 is formed by laminating a graphite layer and a silver layer. Then, via the conductive layer 9, the cathode metal plate 60 is bonded to the under surface of the porous sintered body 1. The tip ends 27 of the anode wires 21A, 21B are bonded to the external anode terminals 3A, 3B. Thereafter, the porous sintered body 1 and the anode wires 21A, 21B are covered by the sealing resin 8 to complete the solid electrolytic capacitor A shown in FIG. 1.

Next, functions of the solid electrolytic capacitor A will be described below.

According to the present embodiment, as shown in FIG. 2, the anode wires 21A, 21B serve as conductive paths between the porous sintered body 1 and the external anode terminals 3A, 3B. As shown in FIG. 1, the conductive paths are inclined at the inclined portions 26 relative to the thickness direction of the porous sintered body 1 (the vertical direction in the figure) and to the longitudinal direction of the circuit board S (the lateral direction in the figure). The inclined portions are inclined in a manner such that they come closer to the external anode terminals 3A, 3B as proceeding apart from the porous sintered body 1. Thus, the conductive paths are formed neither with a portion extending in the vertical direction in the figure nor with a portion bent through an acute angle. Therefore, the conductive paths between the porous sintered body 1 and the external anode terminals 3A, 3B have small inductances and thus have small impedances at a high frequency range. Accordingly, the entire solid electrolytic capacitor A has a small ESL and thus is suitable for improving noise cancellation property at a high frequency range and for supplying power with high responsiveness.

Further, as described above, the cutouts 28 and the resin rings 7 reduce the stress applied to the porous sintered body 1 during the bending process shown in FIG. 6. Thus, it is possible to solve the problems that the conductive paths between the anode wires 21A, 21B and the porous sintered body 1 are blocked, and that the anode wires 21A, 21B unduly come off the porous sintered body 1. In this way, the solid electrolytic capacitor A is prevented from inappropriate conduction or insulation due to the above problems, and thus the solid electrolytic capacitor A can fulfill its function. Still further, as the resin rings 7 partly infiltrate into the porous sintered body 1, the porous sintered body 1 is reinforced. The resin rings 7 have high chemical corrosion resistance, which is preferable to prevent undue erosion during manufacture of the solid electrolytic capacitor A. However, the present invention is not limited to this, but a metal ring-shaped member may be fitted around the metal rods 2A, 2B.

In the present embodiment, a plurality of anode wires 21A, 21B are provided, so that an electric current can be divided into the plurality of anode wires 21A, 21B. Thus, the solid electrolytic capacitor A can have a lowered ESR and a lowered ESL. Further, as the plurality of anode wires 21A, 21B are provided, each of the anode wires 21A, 21B can be thinned down. Thus, in manufacturing the solid electrolytic capacitor A, the bending process of the metal rods 2A, 2B shown in FIG. 6 can be facilitated.

In the present embodiment, the bending process of the metal rods 2A, 2B is performed before forming the dielectric layer. In this way, the dielectric layer is desirably prevented from being unduly broken in the bending process. However, the present invention is not limited to the above-described embodiment, but before performing the bending process, the dielectric layer and the solid electrolyte layer may be first formed and then the conductive layer 9 shown in FIG. 1 may be formed.

Figure 8:
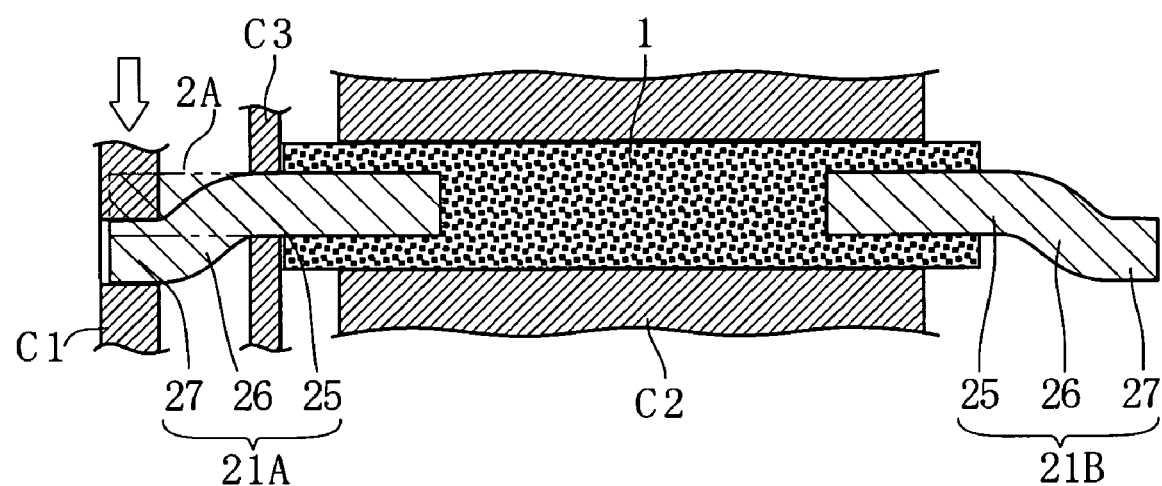
FIG. 8 is a sectional view illustrating a step of a modified method of making the solid electrolytic capacitor of the present invention.

In the present embodiment, as shown in FIG. 5, the cutouts 28 are provided to facilitate the above-described bending process, though the present invention is not limited to this. For example, as shown in FIG. 8, the metal rod 2A may be fixed by the clamp C1 and by another clamp C3, while the clamp C1 moves downward to bend the metal rod 2A. Even in this way, it is possible to prevent excess stress from being applied to the porous sintered body 1.

Figure 9:
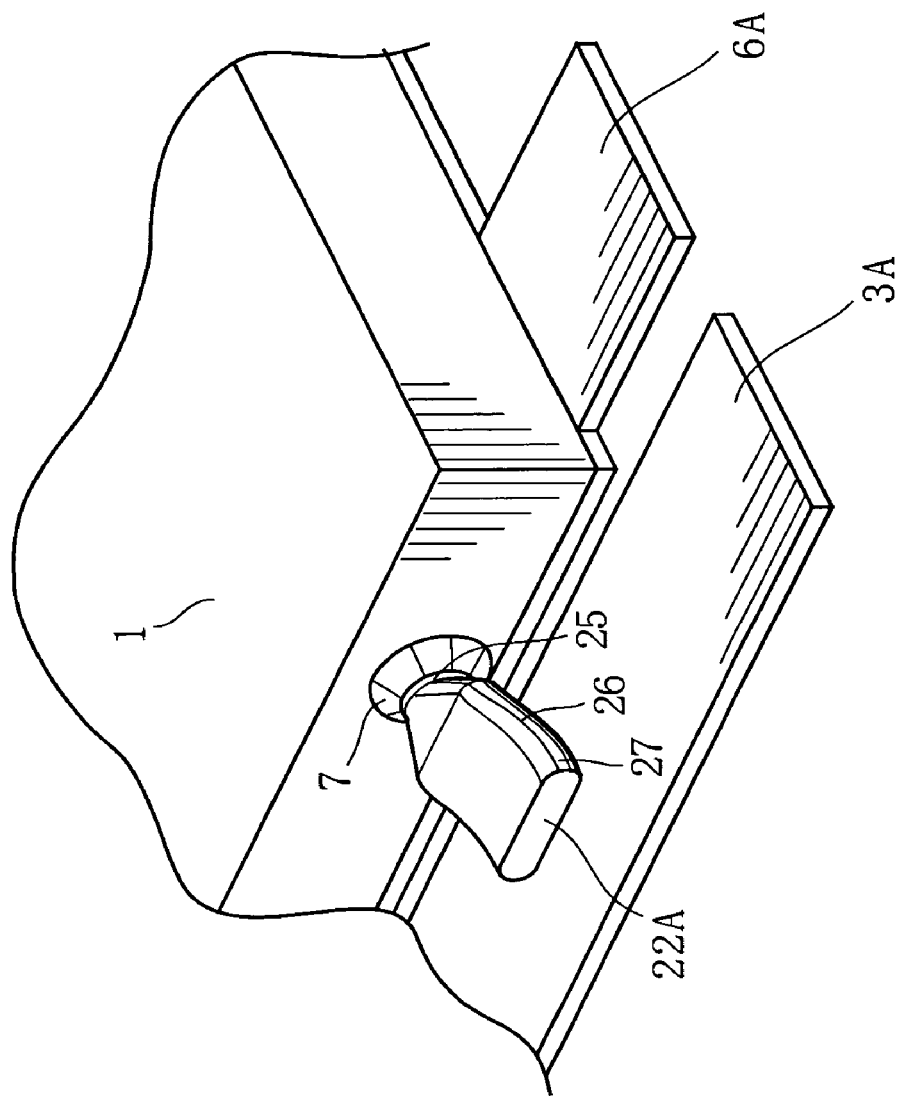
FIG. 9 is a perspective view illustrating the principal part of a solid electrolytic capacitor according to a second embodiment of the present invention.

FIG. 9 illustrates another example of a solid electrolytic capacitor according to the present invention. The illustrated embodiment differs from the above-described embodiment in that the anode wire 22A is partly flat, and the anode wire 22A is arranged at the lower portion of the porous sintered body 1 as seen in the figure. The number and arrangement of the anode wires for input and output are similar to the above-described embodiment.

The anode wire 22A is circular in section at the base 25, but is flat, in the vertical direction of the figure, in section at the inclined portion 26 and the tip end 27. The base 25 is covered by the resin ring 7, similarly to the above-described embodiment. The anode wire 22A is arranged at a portion lower than the intermediate portion in the thickness direction of the porous sintered body 1.

Figure 10:
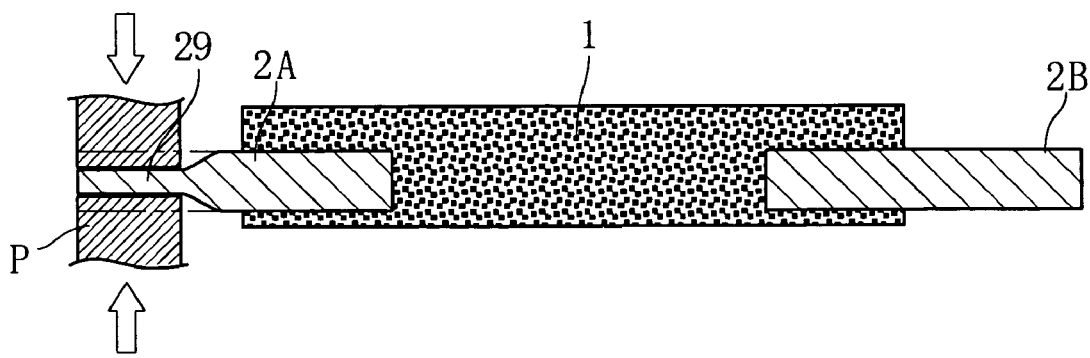
FIG. 10 is a sectional view illustrating a step of a modified method of making the solid electrolytic capacitor of the present invention.
Figure 11:
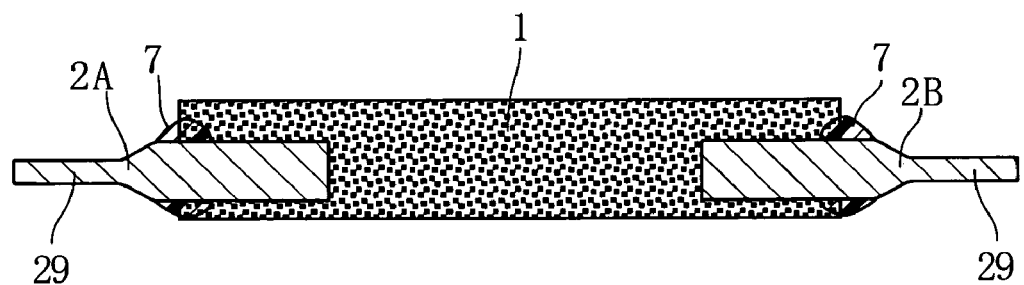
FIG. 11 is a sectional view illustrating another step of the modified method of making the solid electrolytic capacitor of the present invention.
Figure 12:
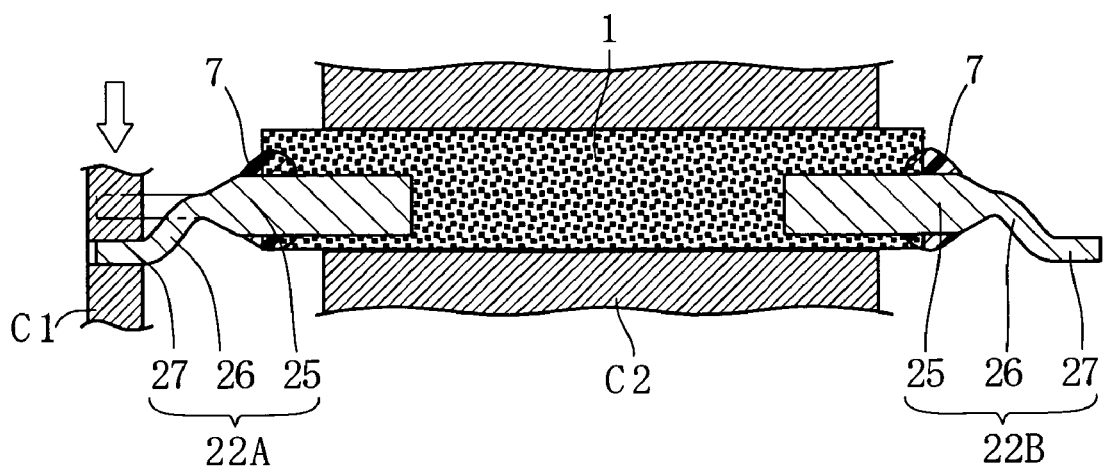
FIG. 12 is a sectional view illustrating another step of the modified method of making the solid electrolytic capacitor of the present invention.

Next, a manufacturing method of such solid electrolytic capacitor is described below. First, the porous sintered body 1 shown in FIG. 10 is made. The porous sintered body 1 is provided with the metal rods 2A, 2B arranged at the lower portion in the figure. A portion adjacent to the each tip end of the metal rods 2A is compressed, in the vertical direction of the figure, by a compressor P to make a flat portion 29. Next, as shown in FIG. 11, a resin ring 7 is formed so as to cover the base 25 of each of the metal rods 2A, 2B. Thereafter, as shown in FIG. 12, the portion adjacent to the tip end of the flat portion 29 is pressed downward by the clamp C1. In this way, the anode wires 22A, 22B having flat inclined portion 26 and flat tip end 27 can be made.

In the present embodiment, as the flat portion 29 is provided, the bending process requires a small force. Thus, it is suitable to reduce the bending force applied to the porous sintered body 1. Further, as shown in FIG. 12, the metal rod 2A is selectively bent at the portion around the right-side surface of the clamp C1 in the figure, and at the end of the flat portion 29 adjacent to the porous sintered body 1. Thus, the bending process can be facilitated. The cutouts 28 shown in FIG. 5 may also be formed before the bending process shown in FIG. 12. In this way, the bending process may be further facilitated.

As shown in FIG. 9, the distance between the anode wires 22A, 22B and the respective external anode terminals 3A, 3B is shortened, so that the anode wires 22A, 22B are bent by a minute angle. Thus, in making such solid electrolytic capacitor, the stress applied to the porous sintered body 1 during the bending process can be reduced. Therefore, the solid electrolytic capacitor can be provided with conductive paths, each of which has shortened height and a minute bended angle at its bending portion, between the porous sintered body 1 and the external anode terminals 3A, 3B. As a result, the conductive paths have small inductances, and thus the solid electrolytic capacitor has a lowered ESL.

Figure 13:
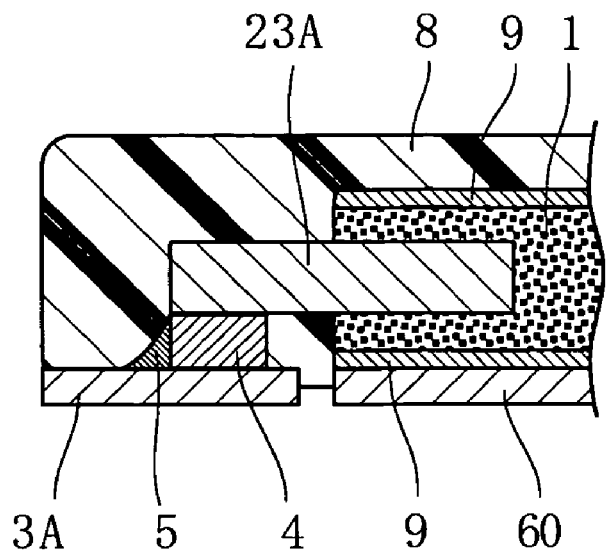
FIG. 13 is a sectional view illustrating the principal part of another example of solid electrolytic capacitor according to the present invention.

FIG. 13 illustrates a modification of the present invention. The illustrated embodiment differs from the above-described two embodiments in that a linear anode wire 23A, conductive member 4, and a solder fillet 5 are provided.

The anode wire 23A linearly projects from one surface of the porous sintered body 1, and is substantially the same as the metal rod 2A shown in FIG. 3, for example. The conductive member 4 is arranged between the anode wire 23A and the external anode terminal 3A, for conduction therebetween. The solder fillet 5 connects the conductive member 4 and the external anode terminal 3A. The solder fillet 5 is formed at the left side surface of the conductive member 4, and is a tapered shape having a gently inclined surface.

In the third example, the solder fillet 5 provides an inclined portion to the conductive path between the porous sintered body 1 and the external anode terminal 3A. Thus, similarly to the above-described first and second examples, the solid electrolytic capacitor has a lowered ESL.

Figure 14:
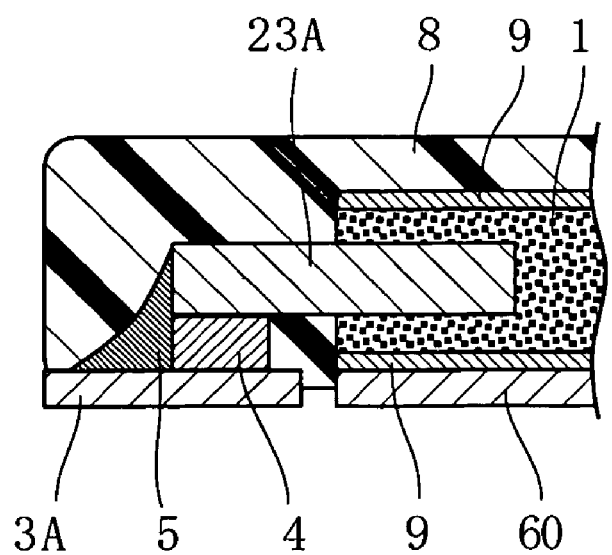
FIG. 14 is a sectional view illustrating the principal part of another example of solid electrolytic capacitor according to the present invention.

In another embodiment shown in FIG. 14, the tapered solder fillet 5 is formed at the left side surface of the conductive member 4 and also at the left end surface of the anode wire 23A. In the fourth example, it is possible to form an inclined conductive path between the left end of the anode wire 23A and the external anode terminal 3A via the solder fillet 5. Thus, the conductive path can have shortened vertical portion, thereby reducing the ESL.

Figure 15:
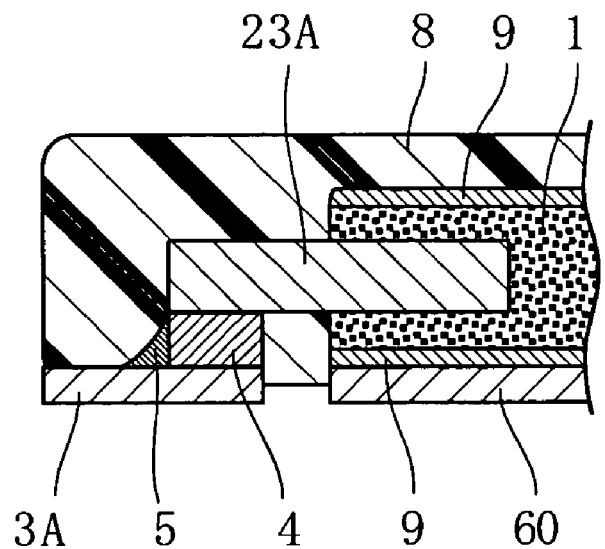
FIG. 15 is a sectional view illustrating the principal part of another example of solid electrolytic capacitor according to the present invention.

In another example shown in FIG. 15, the right end of the conductive member 4 and the right end of the external anode terminal 3A are aligned. According to the present embodiment, differently from the embodiment shown in FIG. 13, no portions of the external anode terminal 3A protrude beyond the conductive member 4 toward the porous sintered body 1. Thus, the conductive path between the anode wire 23A and the external anode terminal 3A can be advantageously inclined, thereby reducing the ESL. In the embodiment shown in FIG. 1, if the protruding portions of the external anode terminals 3A, 3B are shortened, the effect of reducing the ESL may be further achieved.

Figure 16:
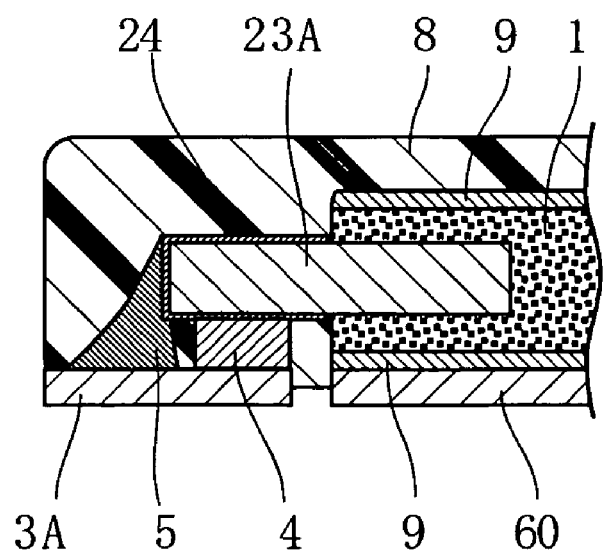
FIG. 16 is a sectional view illustrating the principal part of another example of solid electrolytic capacitor according to the present invention.

Another embodiment shown in FIG. 16 differs from the third through fifth embodiments shown in FIGS. 13-15, in that the solder fillet 5 is not formed at the conductive member 4 but formed only at the anode wire 23A. The anode wire 23A is made of a metal having valve action such as niobium or tantalum, and thus typically has low solderability. In the present embodiment, a portion of the anode wire 23A close to its tip end is coated by a plating 24 to improve the solderability. The plating 24 is formed by coating with palladium as the base and then by coating with nickel thereon. According to the present embodiment, it is also possible to provide the inclined conductive path between the anode wire 23A and the external anode terminal 3A, thereby reducing the ESL.

Figure 17:
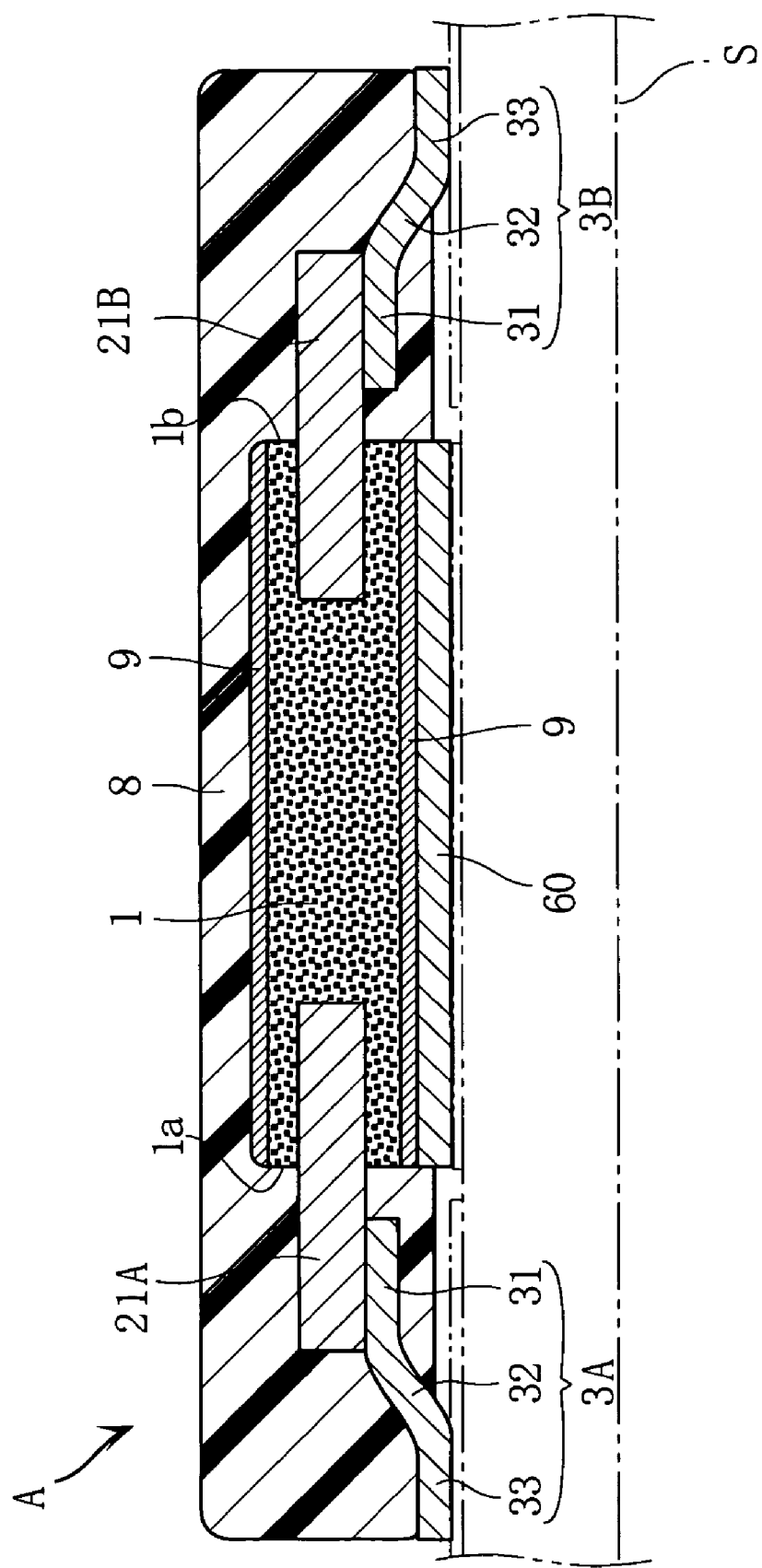
FIG. 17 is a sectional view illustrating another example of solid electrolytic capacitor according to the present invention.
Figure 18:
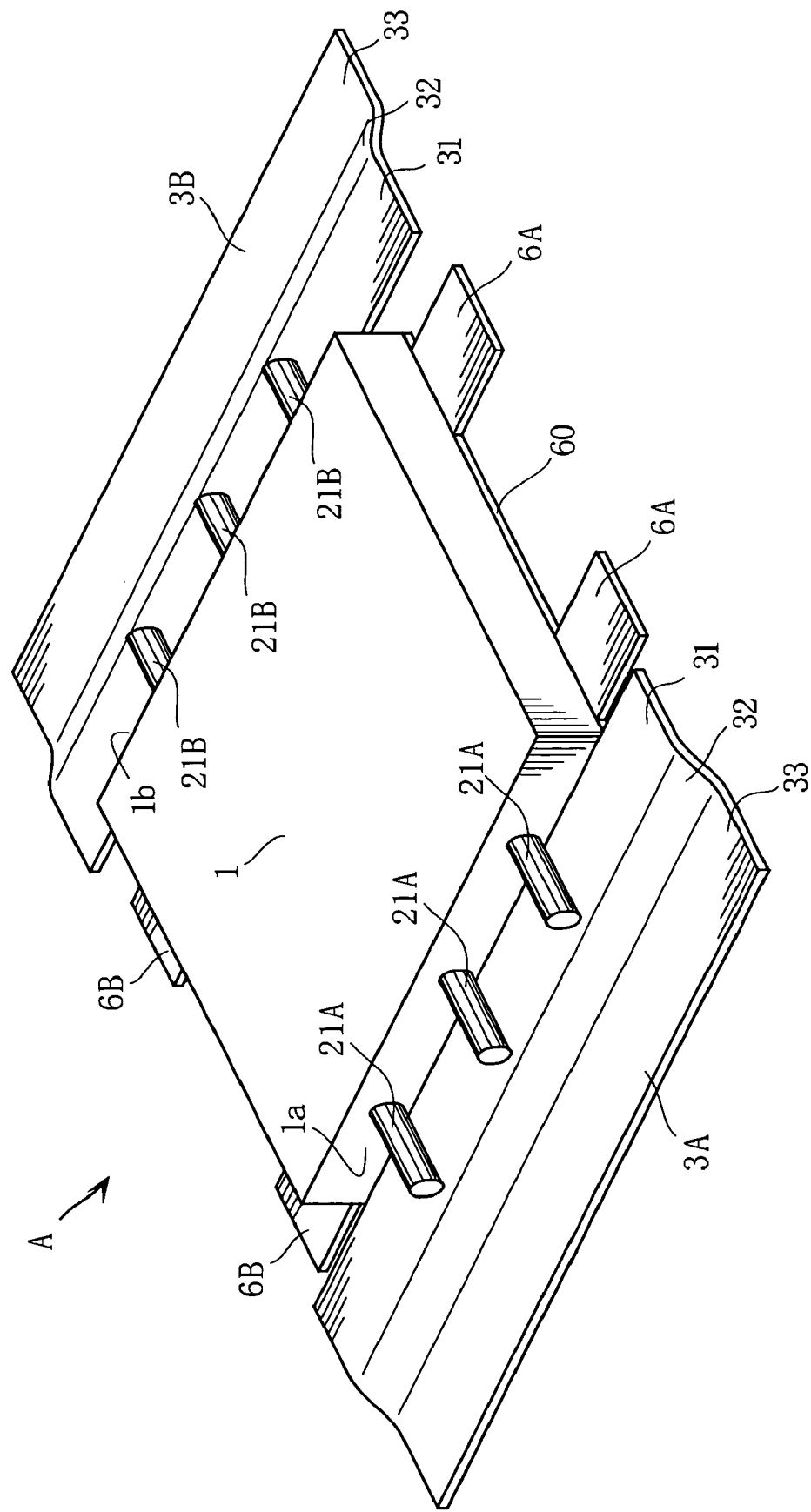
FIG. 18 is a perspective view illustrating the principal part of another example of solid electrolytic capacitor according to the present invention.
Figure 19:
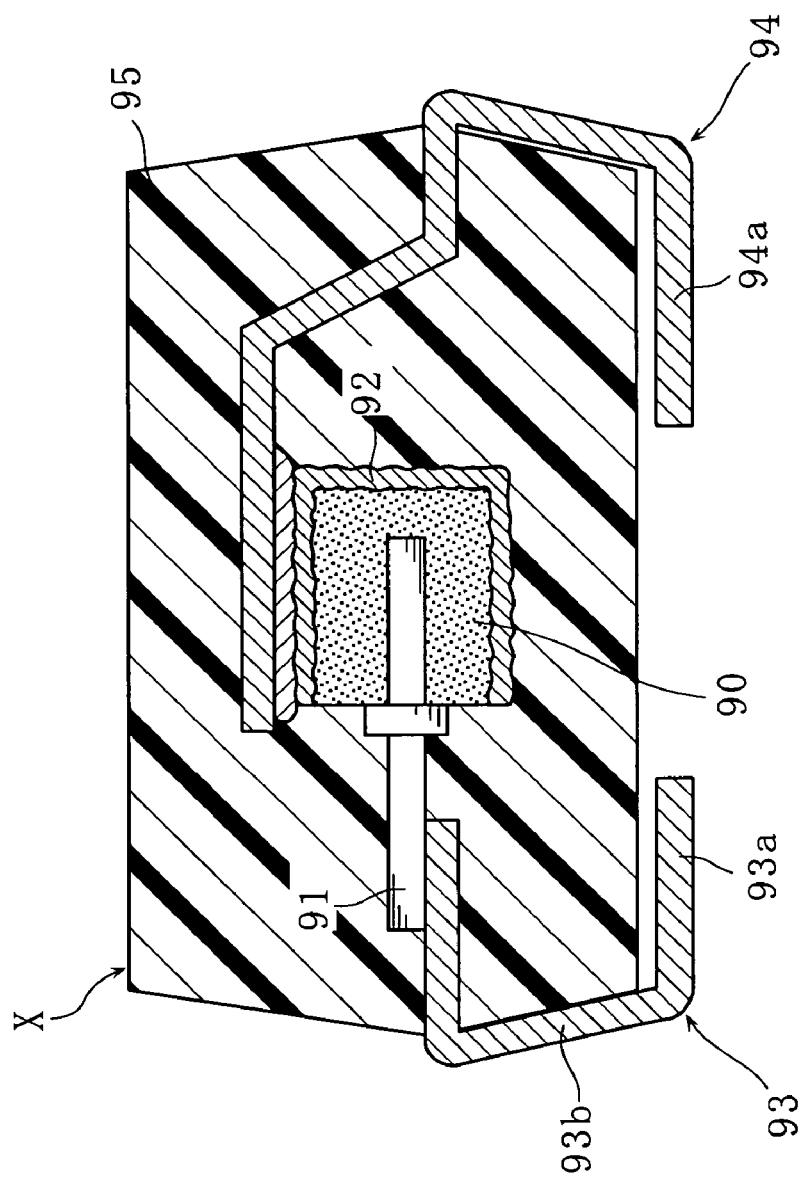
FIG. 19 is a sectional view illustrating an example of a conventional solid electrolytic capacitor.

FIGS. 17 and 18 illustrate another example of the present invention. The present embodiment differs from any of the above-described embodiments in that each of the external anode terminals 3A, 3B includes an inclined portion 32.

The anode wires 21A, 22A linearly protrude from the respective side surfaces 1a, 1b of the porous sintered body 1. Each of the external anode terminals 3A, 3B is formed, through a bending process, with a main plate 31, the inclined portion 32, and a terminal 33. The inclined portion 32 has a gentle inclined angle so that no vertical portion is formed at the conductive path. As shown in FIG. 17, the terminal 33 is partly exposed from the sealing resin 8, so that the exposed portion is used for surface mounting. In the present embodiment, it is also possible to lower the ESL at the solid electrolytic capacitor A. Especially in the solid electrolytic capacitor A having a relatively large porous sintered body 1, the external anode terminals 3A, 3B are also large and thus are suitable to be bent into the shape shown in FIGS. 17 and 18.

The solid electrolytic capacitor according to the present invention is not limited to the above-described embodiments. Specific structure of the solid electrolytic capacitor according to the present invention may be modified variously.

The material of the porous sintered body and the anode wires may be any metal having valve action such as niobium and tantalum. Specific use of the solid electrolytic capacitor according to the present invention is not limited, either.

The invention claimed is:

1. A solid electrolytic capacitor comprising:
   a porous sintered body made of a metal having valve action;
   an external anode terminal for surface mounting; and
   an anode wire made of a metal having valve action and connected to the external anode terminal;
   wherein the external anode terminal is arranged at a position offset to one side relative to an intermediate portion of the porous sintered body in a first direction which is thickness direction of the porous sintered body, while being arranged at a position apart from the porous sintered body in a second direction which is perpendicular to the first direction;
   wherein a conductive path is formed between the porous sintered body and the external anode terminal, the conductive path being inclined relative to both of the first and the second directions and coming closer to the external anode terminal in the first direction as proceeding apart from the porous sintered body in the second direction; and
   wherein the anode wire protrudes from a surface of the porous sintered body that faces in the second direction, the anode wire including an inclined portion inclined relative to both of the first and the second directions to serve as the conductive path.

2. The solid electrolytic capacitor according to claim 1, wherein the anode wire is formed by bending a rod-shaped metal material having valve action.

3. The solid electrolytic capacitor according to claim 2, wherein the anode wire is formed with a cutout at a portion to be bent by the bending.

4. The solid electrolytic capacitor according to claim 2, wherein the anode wire includes a flat portion which is to be bent by the bending, the flat portion being formed by at least partly compressing a portion of the anode wire protruding from the porous sintered body.

5. The solid electrolytic capacitor according to claim 2, wherein a ring is fitted around a base of the anode wire.

6. The solid electrolytic capacitor according to claim 5, wherein the ring is made of a resin.

7. The solid electrolytic capacitor according to claim 1, comprising a plurality of wires each serving as the anode wire.

8. A solid electrolytic capacitor comprising:
a porous sintered body made of a metal having valve action;
an external anode terminal for surface mounting;
an anode wire protruding from the porous sintered body;
a conductive member for conducting the anode wire and the external anode terminal;
wherein the external anode terminal is arranged at a position offset to one side relative to an intermediate portion of the porous sintered body in a first direction which is thickness direction of the porous sintered body, while being arranged at a position apart from the porous sintered body in a second direction which is perpendicular to the first direction;
wherein a conductive path is formed between the porous sintered body and the external anode terminal, the conductive path being inclined relative to both of the first and the second directions and coming closer to the external anode terminal in the first direction as proceeding apart from the porous sintered body in the second direction;
wherein the anode wire protrudes from a surface of the porous sintered body that faces in the second direction;
wherein the conductive member is interposed between the anode wire and the external anode terminal in the first direction; and
wherein a solder fillet is provided to connect the conductive member and the external anode terminal, the conductive path being provided by the solder fillet.

* * * * *